US005191264A

United States Patent [19]

Hammond

[11] Patent Number: 5,191,264

[45] Date of Patent: Mar. 2, 1993

[54] LIGHTING SYSTEM

[75] Inventor: Colin E. Hammond, Huntsville, Ala.

[73] Assignee: MHS Inc., Madison, Ala.

[21] Appl. No.: 780,810

[22] Filed: Oct. 22, 1991

[51] Int. Cl.[5] .......... H05B 37/00; B60Q 1/02

[52] U.S. Cl. .......... 315/291; 362/66; 362/67; 362/287

[58] Field of Search .......... 315/76, 77, 81, 82, 315/363, 291; 362/66, 67, 71, 269, 272, 286, 287, 419, 426, 428, 802

[56] References Cited

U.S. PATENT DOCUMENTS

| | | | |
|---|---|---|---|
| 4,482,939 | 11/1984 | Tishman | 362/64 |
| 4,533,860 | 8/1985 | Saito | 315/82 |
| 4,574,334 | 3/1986 | Igura | 362/66 |
| 4,712,167 | 12/1987 | Gordin et al. | 362/67 |
| 4,727,460 | 2/1988 | Payne | 362/269 |
| 4,890,207 | 12/1989 | Jones | 362/272 X |
| 4,930,057 | 5/1990 | Williams | 362/272 |
| 4,931,916 | 6/1990 | Callahan | 362/272 |

*Primary Examiner*—Eugene R. LaRoche
*Assistant Examiner*—Son Dinh
*Attorney, Agent, or Firm*—Phillips & Beumer

[57] ABSTRACT

A lighting system for discotheques includes a motor driven lamp unit which produces a variable direction light beam. A control device is provided remote from the lamp for controlling its operation, and in order to provide a distinctive visual effect, a control device is provided so that the lamp unit can only be moved by the motor while the lamp is de-energized.

7 Claims, 2 Drawing Sheets

LIGHTING SYSTEM

DESCRIPTION

FIELD OF THE INVENTION

This invention relates to a lighting system having particular but not exclusive application to discotheques and like entertainment venues.

BACKGROUND TO THE INVENTION

Known discotheque lighting systems consist of a bank of lamp units individually driven by motors to change the direction of the beams of illumination produced. The lamp units may be driven individually or in gangs, typically under the control of a central device which may be manually operated or computer controlled e.g. in dependence upon music being played in a discotheque. Visually exciting displays can be produced in this way, to enhance the enjoyment of dancers.

The present invention seeks to provide an improved lighting system capable of producing a distinctive visual effect.

SUMMARY OF THE INVENTION

In accordance with the present invention there is provided a lighting system including a lighting device comprising a lamp unit with a lamp energizable to produce a beam of illumination, and motor means for driving the lamp unit to change the direction of the beam, and control means for association with the lighting device to cause the lamp unit to be moved by the motor means only whilst the lamp is de-enerzied; and a lamp control device remote from the lighting device and the control means for controlling energization of the lamp.

Conveniently, the lighting device includes a base with the lamp unit mounted thereon, and first and second motor means for rotating the lamp unit about transverse axes to change the direction of the beam, said control means being mounted on the base.

The control means may control an individual lighting device or may be arranged to control a group thereof. In the case of a group, the motor means may operate at the same speed and in synchronism, or at differing speeds.

A filter wheel including a plurality of different colour filters may be rotatably mounted in the beam of the lamp unit and driven by a filter wheel motor. This motor may additionally be controlled by said control means so that the filter wheel is only rotated whilst the lamp de-enerzied.

BRIEF DESCRIPTION OF THE DRAWINGS

In order that the invention may be more fully understood an embodiment thereof will now be described by way of example with reference to the accompanying drawings in which.

DESCRIPTION OF PREFERRED EMBODIMENTS

Figure 1:
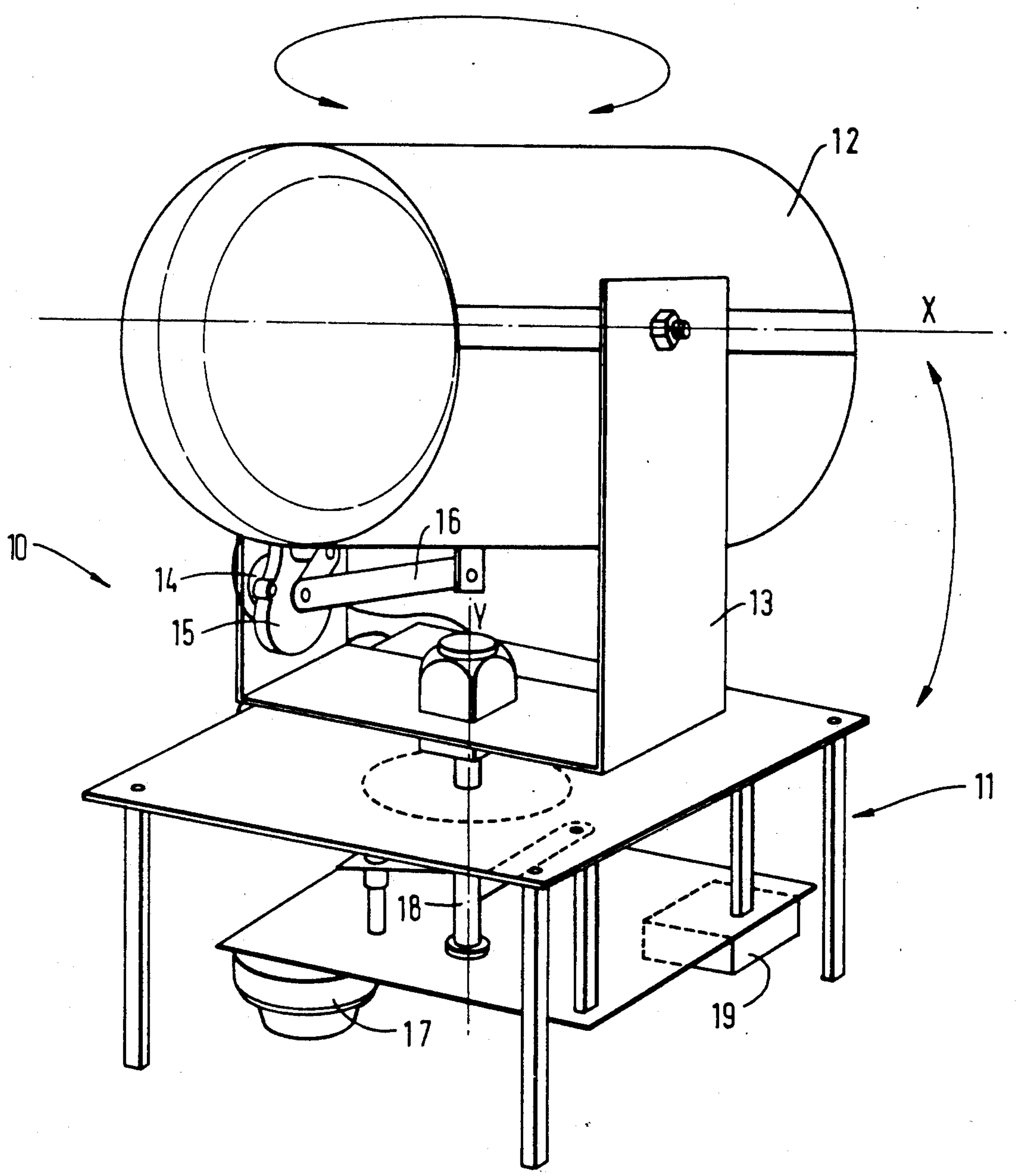
FIG. 1 is a schematic perspective view of a lighting device for use in a lighting system according to the invention.

Referring to FIG. 1, the lighting device is referenced generally 10 and consists of a base 11 and a lamp unit 12 mounted on the base by means of a yoke 13, which permits the lamp unit 12 to be pivoted about a horizontal or X-axis together with a vertical Y-axis.

Movement of the lamp unit 12 about the X-axis is performed by an X-axis electric motor 14 which drives a reduction gear 15 that is connected through an eccentric lever arrangement 16 to the lamp unit 12. This operates in a conventional manner and will not be described in detail.

In regard to the Y-axis, an electric motor 17 drives a shaft 18 so as to rotate the yoke 13 and thereby turn the lamp unit 12 about the Y-axis.

The motors 12, 17 are electrically connected to a control circuit 19.

Figure 2:
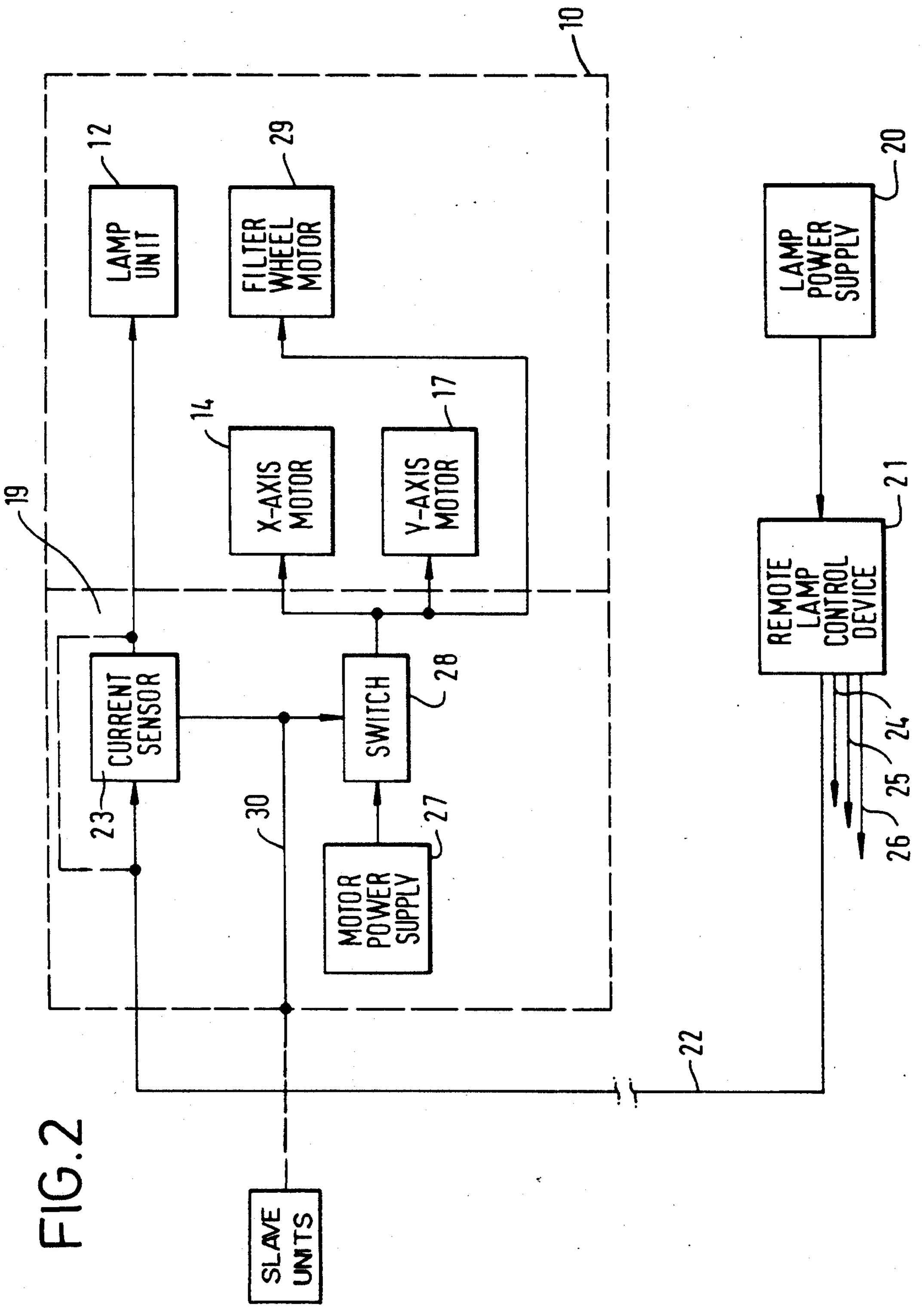
FIG. 2 is a schematic block diagram of a lighting system according to the invention.

Referring now to FIG. 2 which shows the electrical circuit for the system, in block diagrammatic form, electrical power for the lamp unit 12 is fed from a supply 20 via a remote lamp control device 21 to the lamp unit through control line 22 via a current sensor 23. The power supply to the lamp may be a conventional domestic mains supply. The remote lamp control device 21 may comprise a control board for the control of the plurality of lighting devices 10 individually controllable on lines 24, 25, 26 etc.

Power for the X-axis and Y-axis motors 14, 17 is provided by supply 27 under the control of a switch 28 operated by the current sensor 23. The current sensor 23 and switch 28 may comprise an electromechanical relay or a solid-state switching circuit.

The circuit is so arranged that when the lamp unit 12 is de-energized i.e. does not receive current through line 22 the switch 28 is closed so that power from supply 27 is fed to the motors 14, 17. In this way, the lamp unit 12 is moved about the X and Y axes cyclically in a quasi-random manner.

When the lamp unit 12 is switched on by the remote control device 21, the current sensor 23 detects the supply of current to the lamp unit and operates switch 28 so as to disconnect the motor power supply 27 and thereby stop the motors 14, 17. In this way, the orientation of the lamp, upon switch-on, is determined in a quasi-random manner, and the orientation of the light beam produced by the lamp unit 12 remains stationary until the lamp is switched off, at which time the motor supply 27 is reconnected to the motors 14, 17 thereby repositioning the lamp unit 12 prior to the next occasion the lamp is switched on.

When a number of lighting devices 10 are controlled in this manner over lines 22, 24, 25 and 26, a quasi-random, a visually spectacular display is produced which has great appeal for use in discotheques.

In a development of the invention shown in FIG. 2 a conventional coloured filter wheel is provided in front of the lamp unit 12, driven by a motor 29. The filter wheel is not shown in FIG. 1 but is conventional and of a structure well known to those skilled in art. In accordance with the invention, the filter wheel motor may be connected to the power supply 27 under the control of switch 28 so that upon switch-on the lamp unit, the colour of the light beam produced by the unit 12 is selected by the filter wheel motor in a substantially random manner.

Instead of being controlled individually, lighting devices 10 may be arranged in ganged groups in which current sensor 23 is arranged to control operation of a group of devices 10. To this end, a plurality of slave units 10 may be provided each having a circuit similar to that shown in FIG. 2 but with the current sensor 23 omitted or inoperative and individual switches 28 connected to the current sensor 23 of the unit 10 shown in FIG. 2, by means of external connection 30. The X and Y-axis motors of the individual units may be arranged to operate in synchronism so that the lamp units 12 produce a bank of parallel beams, or, alternatively, the motors may be operated at different speeds in order to give a random effect.

Whilst in the foregoing both the X and Y-axis motors 14, 17 are described as being controlled by the switch 28, it will be appreciated that in a modification, only one of the motors may be controlled. Also, whilst the remote control device 21 is described as switching main supply to the lamp unit 12 it will be appreciated that low voltage switching signals could be utilised over line 22 with a local, low voltage supply for the lamp unit 12 being provided within the lighting device 10. Also, whilst the control unit 19 is shown mounted on the base of the device 10, it could be provided as a separate unit to be retofitted to existing lighting systems. The remote control device 21 may comprise a series of switches for the individual devices 10, which are controllable manually. Alternatively, the lighting may be controlled by electronic switching arrangements driven in response to music played in the discotheque in a manner known per se.

I claim:

1. A lighting system including a lighting device comprising a lamp unit with a lamp energizable to produce a beam of illumination, and motor means for driving the lamp to change the direction of the beam; control means for association with the lighting device to cause the lamp unit to be moved by the motor means only whilst the lamp is de-energized; and a lamp control device remote from the lighting device and the control means for controlling energization of the lamp.

2. A lighting system according to claim 1 wherein the control means includes current sensing means for sensing a supply of current to the lamp, switching means responsive to the current sensor means to disconnect the supply of electrical power to the motor means whilst current is supplied to the lamp.

3. A lighting system according to claim 1 wherein the lighting device includes a base, means mounting the lamp unit for rotatation about transverse axes relative to the base, and first and second electrical motors for rotating the lamp unit about said axes respectively.

4. A lighting system according to claim 1 including a plurality of said lighting devices each individually controllable from the remote location by said lamp control device.

5. A lighting system according to claim 4 wherein said control means is mounted on the first of said lighting devices and is arranged to operate a gang thereof.

6. A lighting system according to claim 5 wherein said gang is arranged to operate in synchronism.

7. A lighting system according to claim 1 wherein the or each said lighting device includes a filter wheel driven by a filter wheel motor, and said control means arranged to energize said filter wheel motor only whilst said lamp is de-energized.

* * * * *